N. WILKINSON.
COIL PRESS.
APPLICATION FILED MAY 23, 1910.
1,173,471. Patented Feb. 29, 1916.
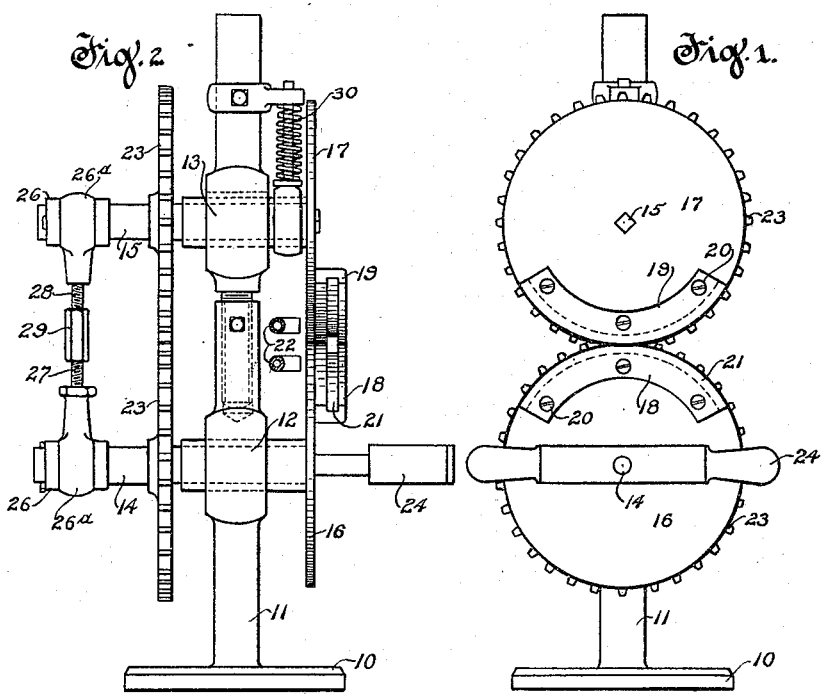
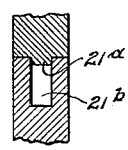
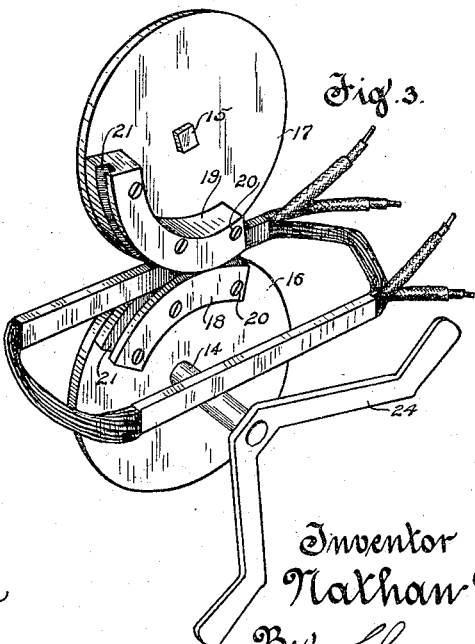
Witnesses
John L. Johnson
Chas. L. Byron
Inventor
Nathan Wilkinson
By Chas. E. Lord
Attorney

UNITED STATES PATENT OFFICE.

NATHAN WILKINSON, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

COIL-PRESS.

1,173,471.  Specification of Letters Patent.  Patented Feb. 29, 1916.

Application filed May 23, 1910. Serial No. 562,917.

*To all whom it may concern:*

Be it known that I, NATHAN WILKINSON, a citizen of the United States, residing at Milwaukee, in the county of Milwaukee and State of Wisconsin, have invented certain new and useful Improvements in Coil-Presses, of which the following is a full, clear, and exact specification.

This invention relates to presses for shaping or pressing coils of windings for electrical apparatus, and more particularly for coils of dynamo-electric machines. Where large quantities of coils are made there is, at times, a large surplus stock on hand, which may not be used for a considerable length of time. Again, coils which are made for immediate use may be shipped a considerable distance before they are placed in the core structure of an electric machine. If these coils are allowed to dry without final shaping and pressing they assume irregular shapes which are not calculated upon by the engineer when designing such coils. If coils are placed in the slots of cores when the coils are first formed and are quite flexible no particular difficulty is encountered in winding a machine. But if the coils are allowed to dry unpressed it is practically impossible to wind a machine without seriously injuring the coils and in a great many instances destroying their effective use commercially.

In consideration of the above it is the object of my invention to provide a coil press which will shape properly newly-formed coils making their shapes and dimensions definite. After these coils are pressed by my coil press they may be stored away for any length of time before putting them into use without their shapes being distorted or changed. They are furthermore of the exact dimensions calculated by the designer, and a snug fit of the coils in the slots of the core is obtained and the coils put in place without injuring them in any possible way.

The various novel features of my invention will be described in the specification and particularly set forth in the appended claims.

In the accompanying sheet of drawings, Figure 1 is a front elevation of the coil press; Fig. 2 is a side elevation of the same; Fig. 3 is a perspective view of the shaping members with a coil therein, and Fig. 4 is a sectional view of the preferred form of the shaping or pressing members of the press.

Mounted upon a suitable base 10 is a support 11 which is provided with two bearings 12 and 13 respectively for the reception of shafts 14 and 15 respectively which are adapted to rotate therein. These bearings 12 and 13 are formed, preferably, by boring the support 11 and if necessary the bored portions are provided with some good bearing material, such as Babbitt metal, upon which the shafts may move freely. Mounted upon one end of the shafts 14 and 15 are disks 16 and 17 respectively which are provided with coöperating shaping members 18 and 19 respectively. These shaping or pressing members which are secured to the disks by screws 20 are of metal and shaped to form arcs of circles. These members are provided with registering shaping slots or grooves 21 for the reception of coils which are to be pressed. The shaping slots or grooves terminate abruptly or at definite points to avoid cutting the insulation or coils at points where the coils are bent.

In the preferred form of modification I wish to use shaping or pressing members having coöperating tongue and grooved portions 21$^a$ and 21$^b$ respectively. As here shown the slots are rectangular in cross section for forming a coil in the same shape, but shaping members with any form of slots or grooves and dimensions may be used depending upon the desired shape of the coil to be pressed. Shaping members having shaping slots or grooves of various lengths may be used as the disks 16 and 17 are suitable for supporting shaping members of different lengths so that coils of a variety of sizes may be pressed by merely securing a different set of shaping members to the rotary disks 16 and 17. If it be desired to shape coils too heavy and large to be handled by the disks and shaping members on the machine, larger disks and shaping members may be substituted therefor.

The support 11 is made adjustable as indicated in Fig. 2 of the drawings so that the distance between the shafts may be varied easily, thereby permitting the use of any size disks within the limits of the machine. These disks and shaping members are formed preferably of some good conducting material so that heat transmitted to the disks and shaping members may be conducted readily to all parts thereof for drying the coils during the shaping process. In this particular case the disks and shaping members are heated by gas flames, the gas being carried by pipes 22 directed toward the disks 16 and 17.

In order to keep the disks and shaping members in engagement at all times a spring 30 has been provided which holds down the upper shaft in the same position under normal conditions and permits its rise slightly when the disks expand due to heat. The bearing 13 in the support 11 is made large enough to permit the necessary vertical movement of the shaft 15 when the disks expand.

Gear wheels 23 are mounted upon shafts 14 and 15 on the side of the support 11 opposite the disks for the purpose of giving the disks a rotary movement when one or the other of said shafts is caused to rotate. As here shown the lower shaft 14 is provided with a handle 24 by means of which said lower shaft and gear wheel are rotated causing the upper gear wheel 23 and shaft 15 to rotate. By means of this system of transmission the disks are given an effective rotary movement in either direction. In case it is necessary to vary the distance between the shafts, gear wheels of different sizes may be substituted by simply removing a pair of balancing bearings 26. These balancing bearings are mounted on the ends of the shafts 14 and 15 not occupied by the disks 16 and 17 and assist the supporting member in maintaining the shafts in a steady operating condition. The bearings have housings 26ᵃ to which are connected the right and left-hand threaded members 27 and 28 respectively. A turn-buckle 29 engages the threaded members 27 and 28 and is adapted to vary the distance between the shafts and to maintain the shafts at the same distance apart as they are at the other end.

This coil press which is suitable for pressing coils of any size is simple and durable in construction, reliable in operation and cheap to manufacture. It has been tested and used commercially and has met all requirements of the work for which it was designed.

There may be many modifications of the precise form and arrangement herein shown and described, and I aim in my claims to cover all such modifications which do not depart from the spirit and scope of my invention.

What I claim as new is:

1. A coil press comprising a plurality of rotatable members provided with coöperative segmental elements, and means for rotating said members, said segmental elements being provided with recesses that coöperate during rotation of said members to form a recess for the reception of a coil side, whereby said coil side may be given a definite shape during the operation of said press.

2. A coil press comprising a support, shafts mounted in said support, detachable segmental coöperating members mounted on said shafts, the peripheral surfaces of said segmental members being provided with opposed shaping recesses, and means for transmitting power from one shaft to the other to cause a relative movement between said shaping members.

3. A coil press comprising a support, shafts mounted on said support, rotary disks mounted on said shafts, detachable segmental members mounted on said disks, the peripheral surfaces of said segmental members being recessed throughout for the reception of a side of a coil to be shaped, a driving connection between said shafts, and means acting to retain said shafts in proper operative relation one to another, said means comprising bearing elements associated with said shafts, one of said elements being adjustable relatively to another element.

4. A coil press comprising a support, shafts mounted on said support, detachable segmental members given movement by said shafts, at least one of said segmental members being recessed peripherally whereby a shaping recess is formed between said segmental members when the same are in operative relation, and means comprising a spring holding said shaping members in engagement with each other, one of said shafts being loosely mounted in said support to permit bodily movement toward or away from the other shaft.

5. A coil press comprising a supporting frame, driving and driven shafts journaled in said frame, disks mounted on adjacent ends of said shafts and provided with shaping members adapted to coöperate in shaping a coil passed between said members, means engaging one of said shafts adjacent the disk mounted thereon for resiliently urging said shaft toward the other one of said shafts, and adjustable means engaging the other end of each shaft for holding said shafts in spaced relation.

6. A coil press comprising a supporting frame, shafts journaled in said frame, disks mounted on adjacent ends of said shafts on one side of said frame and provided with shaping members adapted to coöperate in shaping a coil passed between said members, means engaging one of said shafts adjacent the disk mounted thereon for resiliently urging said shaft toward the other one of said shafts, and adjustable means engaging the other end of each shaft on the other side of said frame for holding said shafts in spaced relation.

7. A coil press comprising a supporting frame, shafts journaled in said frame, shaping members mounted on adjacent ends of said shafts and adapted to coöperate in shaping a coil passed between said members, resilient means for urging one shaft toward the other, and adjustable means coöperating with each shaft for holding said shafts in spaced relation.

In testimony whereof I affix my signature in the presence of two witnesses.

NATHAN WILKINSON.

Witnesses:
CHAS. L. BYRON,
JOHN L. JOHNSON.